(12) United States Patent
Kojima et al.

(10) Patent No.: US 11,137,081 B2
(45) Date of Patent: Oct. 5, 2021

(54) CONTROL VALVE

(71) Applicant: KYB Corporation, Tokyo (JP)

(72) Inventors: Masanari Kojima, Kanagawa (JP); Masayuki Nakamura, Kanagawa (JP); Takeshi Terao, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 54 days.

(21) Appl. No.: 16/619,323

(22) PCT Filed: Sep. 28, 2018

(86) PCT No.: PCT/JP2018/036404
§ 371 (c)(1),
(2) Date: Dec. 4, 2019

(87) PCT Pub. No.: WO2019/138612
PCT Pub. Date: Jul. 18, 2019

(65) Prior Publication Data
US 2020/0096121 A1    Mar. 26, 2020

(30) Foreign Application Priority Data
Jan. 12, 2018  (JP) .............................. JP2018-003645

(51) Int. Cl.
*F16K 11/07* (2006.01)
*F15B 13/042* (2006.01)

(52) U.S. Cl.
CPC ............ *F16K 11/07* (2013.01); *F15B 13/042* (2013.01); *F15B 13/0426* (2013.01)

(58) Field of Classification Search
CPC .... F16K 11/07; F16K 11/0716; F15B 13/042; F15B 13/0426; F15B 13/0402; F15B 2211/76; F15B 2211/528; F15B 2211/55; F15B 2211/3122; F15B 2211/5157; F15B 2211/511; F15B 11/028
See application file for complete search history.

(56) References Cited

U.S. PATENT DOCUMENTS

| | | | |
|---|---|---|---|
| 4,320,691 A * | 3/1982 | McWilliams | F15B 13/042 137/596.15 |
| 6,186,172 B1 * | 2/2001 | Yoshida | F15B 11/042 137/596.15 |
| 2009/0301588 A1 * | 12/2009 | Shimizu | F16K 31/0613 137/625.64 |
| 2018/0202472 A1 * | 7/2018 | Kuromusha | F15B 13/0807 |

FOREIGN PATENT DOCUMENTS

| | | |
|---|---|---|
| JP | S60-191706 U | 12/1985 |
| JP | H02-266103 A | 10/1990 |
| JP | 2009-228872 A | 10/2009 |

* cited by examiner

*Primary Examiner* — Kelsey E Cary
(74) *Attorney, Agent, or Firm* — Rabin & Berdo, P.C.

(57) ABSTRACT

A control valve includes a housing formed with first and second supply ports, first and second actuator ports, and a pilot port, and a spool accommodated slidably in the housing, and the spool is configured to allow the first supply port and the pilot port to communicate with each other both at the first communication position and the second communication position.

11 Claims, 9 Drawing Sheets

CONTROL VALVE

TECHNICAL FIELD

The present invention relates to a control valve.

BACKGROUND ART

JP2009-228872A discloses a control valve that controls an actuator. This control valve includes a housing having a bridge passage and a spool slidably assembled into the housing. When at a neutral position, the spool shuts off communication between a pair of supply ports of the bridge passage and a pair of actuator ports. When switched to a first operation position, the spool allows one of the supply ports to communicate with one of the actuator ports, while when switched to a second operation position, the spool allows the other supply port to communicate with the other actuator port. As a result, a working fluid is supplied from the pump to the actuator through the bridge passage, and the actuator is operated.

Moreover, a pilot port that lead a working fluid discharged from a pump as a pilot pressure to a pilot chamber of another device or the like is formed in the housing of the control valve disclosed in JP2009-228872A. When the spool is at the neutral position, the working fluid that is discharged from the pump is led to the tank through the pilot port. When the spool is switched to the first operation position or to the second operation position, the pilot port is shut off, and the working fluid that is discharged from the pump is led to the pilot chamber. As described above, there is a one in which the pilot port is formed in the housing in order to lead the pilot pressure to the pilot chamber of another device or the like.

SUMMARY OF INVENTION

However, there is such an occasion that communication between the pilot port and the pilot chamber is shut off when the spool is at the neutral position, and the working fluid that is discharged from the pump is to be led to the pilot chamber through the pilot port when the spool is switched to the first operation position or to the second operation position in some cases. In such a case, two ports, that is, a pilot port communicating with the pilot chamber when the spool is switched to the first operation position and a pilot port communicating with the pilot chamber when the spool is switched to the second operation position, are needed. If two pilot ports are formed in the housing, the housing becomes larger for that portion, and size reduction of the control valve becomes difficult.

The present invention has an object to reduce the size of the control valve.

According to one aspect of the present invention, a control valve that controls a flow of a working fluid from a pump to an actuator and that controls the flow of the working fluid from the pump to a pilot chamber of another fluid pressure device includes a housing formed with a housing formed with first and second supply ports, first and second actuator ports, and a pilot port, the first and second supply ports being connected to the pump, the first and second actuator ports being connected to the actuator, the pilot port being connected to the pilot chamber, and a spool accommodated slidably in an axial direction in the housing, the spool being configured to be switched between a first communication position where the first supply port and the first actuator port are allowed to communicate with each other and a second communication position where the second supply port and the second actuator port are allowed to communicate with each other, wherein the spool is configured to allow the first supply port and the pilot port to communicate with each other both at the first communication position and the second communication position.

DESCRIPTION OF EMBODIMENTS

Hereinafter, a control valve according to an embodiment of the present invention will be described by referring to the attached drawings. In this embodiment, a case where the control valve is a tilt control valve 60 provided in a fluid pressure control device 100 will be described. The fluid pressure control device 100 is mounted on a forklift, for example.

Figure 1:
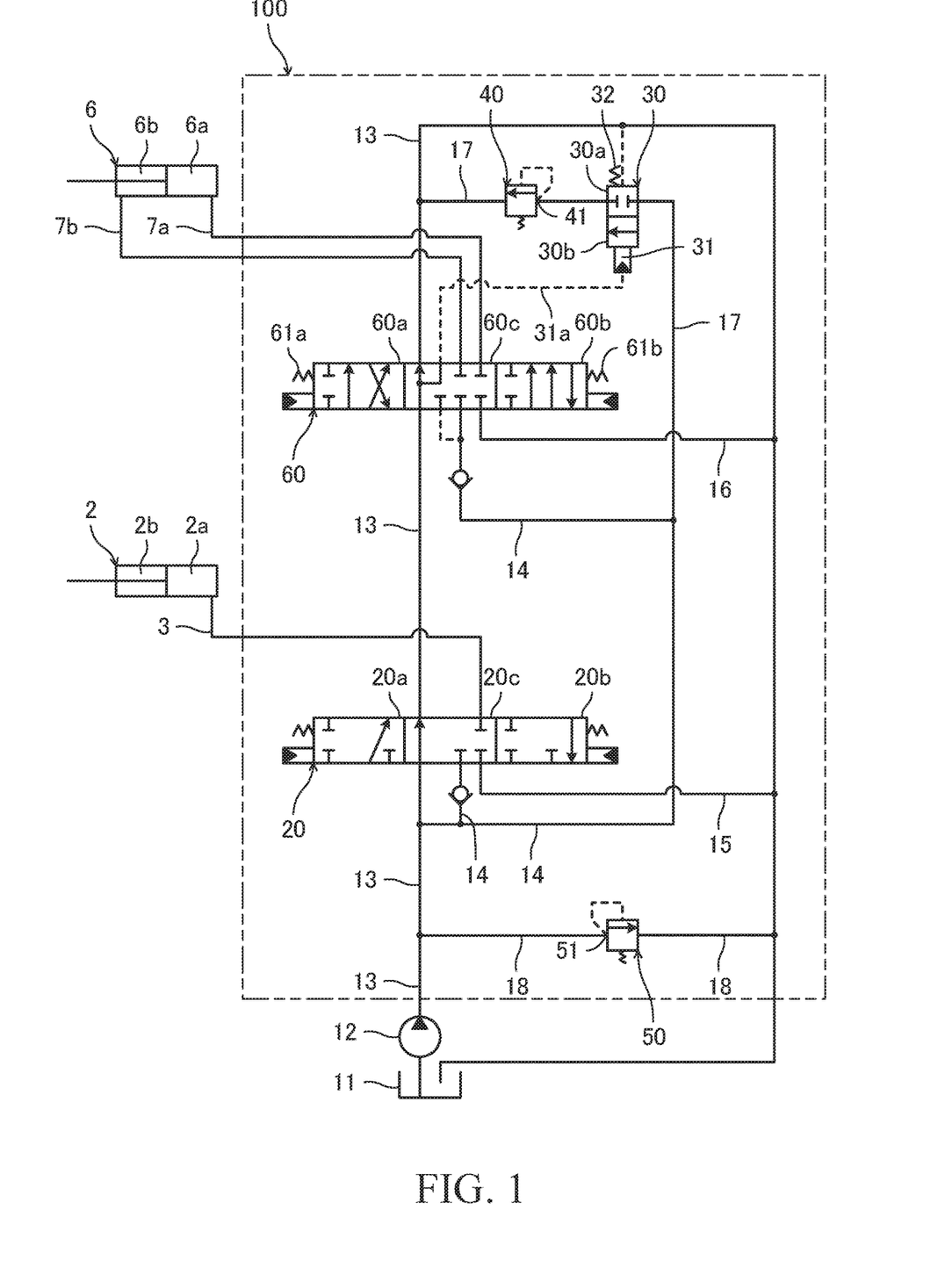
FIG. 1 is a circuit diagram of a fluid pressure control device including a control valve according to an embodiment of the present invention.

As illustrated in FIG. 1, the fluid pressure control device 100 controls operations of a lift cylinder 2 and a tilt cylinder 6 as actuators. The lift cylinder 2 elevates a fork (not shown) of the forklift up/down, and the tilt cylinder 6 changes a tilt angle of a mast (not shown) of the forklift.

When a working oil is supplied from the fluid pressure control device 100 to an anti-rod side chamber 2*a* of the lift cylinder 2, the lift cylinder 2 is extended. On the other hand, when the working oil is discharged from the anti-rod side chamber 2*a*, the lift cylinder 2 is contracted. The fork is elevated up/down in accordance with extension/contraction of the lift cylinder 2.

When the working oil is supplied from the fluid pressure control device 100 to an anti-rod side chamber 6*a* of the tilt cylinder 6, and the working oil is discharged from a rod side chamber 6*b* of the tilt cylinder 6, the tilt cylinder 6 is extended. On the other hand, when the working oil is supplied from the fluid pressure control device 100 to the rod side chamber 6*b*, and the working oil is discharged from the anti-rod side chamber 6*a*, the tilt cylinder 6 is contracted. The tilt angle of the mast is changed in accordance with extension/contraction of the tilt cylinder 6.

As described above, the fluid pressure control device 100 controls the operations of the lift cylinder 2 and the tilt cylinder 6 by controlling a flow of the working oil supplied/discharged to/from the lift cylinder 2 and the tilt cylinder 6.

Though not shown, the fluid pressure control device 100 may control an operation of an actuator, which is for example a fork positioner that adjusts an interval between forks, other than the lift cylinder 2 and the tilt cylinder 6.

The fluid pressure control device 100 includes a tank 11 that stores the working oil, a pump 12 that pumps up the working oil from the tank 11 and that discharges the working oil, and a neutral passage 13 that connects the pump 12 to the tank 11. The pump 12 is driven by a driving source (not shown) such as an engine and a motor and discharges the working oil to the neutral passage 13. In a state where a flow of the working oil in the neutral passage 13 is not shut off, the working oil from the pump 12 is discharged to the tank 11 through the neutral passage 13.

Moreover, the fluid pressure control device 100 includes a lift control valve 20 that controls the flow of the working oil supplied to/discharged from the lift cylinder 2 and a tilt control valve 60 that controls the flow of the working oil supplied to/discharged from the tilt cylinder 6. The lift control valve 20 and the tilt control valve 60 are provided in the neutral passage 13 in this order from an upstream side.

The lift control valve 20 is connected to an anti-rod side chamber 2a of the lift cylinder 2 through the lift passage 3. The tilt control valve 60 is connected to the anti-rod side chamber 6a of the tilt cylinder 6 through a first tilt passage 7a and is connected to the rod side chamber 6b of the tilt cylinder 6 through a second tilt passage 7b.

A supply passage 14 branching from an upstream side of the lift control valve 20 in the neutral passage 13 is connected in parallel with the lift control valve 20 and the tilt control valve 60. Moreover, return passages 15 and 16 are connected to the lift control valve 20 and the tilt control valve 60, respectively. The return passages 15 and 16 are connected to a downstream side of the tilt control valve 60 in the neutral passage 13. The return passages 15 and 16 may be directly connected to the tank 11 without passing through the downstream side of the tilt control valve 60 in the neutral passage 13.

The lift control valve 20 has three positions, that is, an extended position 20a, a contracted position 20b, and a neutral position 20c. When at the neutral position 20c, the lift control valve 20 allows the flow of the working oil in the neutral passage 13. At this time, the lift control valve 20 shuts off communication between the supply passage 14 and the lift passage 3 and the communication between the return passage 15 and the lift passage 3. As a result, supply/discharge of the working oil to/from the lift cylinder 2 is shut off, and the lift cylinder 2 is stopped.

When switched to the extended position 20a, the lift control valve 20 shuts off the flow of the working oil in the neutral passage 13. At this time, the lift control valve 20 allows the supply passage 14 and the lift passage 3 to communicate with each other. As a result, the working oil is supplied to the anti-rod side chamber 2a of the lift cylinder 2, and the lift cylinder 2 is extended.

When switched to the contracted position 20b, the lift control valve 20 shuts off the flow of the working oil in the neutral passage 13. At this time, the lift control valve 20 allows the lift passage 3 and the return passage 15 to communicate with each other. As a result, the working oil is discharged to the tank 11 from the anti-rod side chamber 2a, and the lift cylinder 2 is contracted.

The tilt control valve 60 has three positions, that is, an extended position 60a as a first communication position, a contracted position 60b as a second communication position, and a neutral position 60c. Since control of the flow of the working oil by the tilt control valve 60 is substantially the same as the control of the flow of the working oil by the lift control valve 20, the description here is omitted.

Moreover, the fluid pressure control device 100 includes a low-pressure relief passage 17 branching from the supply passage 14 and a high-pressure relief passage 18 branching from the upstream side of a branching point from the supply passage 14 in the neutral passage 13. The low-pressure relief passage 17 and the high-pressure relief passage 18 are connected to the downstream side of the tilt control valve 60 in the neutral passage 13. In the low-pressure relief passage 17, a switching valve 30 as another fluid pressure device which will be described later and a low-pressure relief valve 40 are provided in this order from the upstream side. In the high-pressure relief passage 18, a high-pressure relief valve 50 is provided.

The switching valve 30 has a shut-off position 30a which shuts off the flow of the working oil and a communication position 30b which allows the flow of the working oil. The position of the switching valve 30 is switched by the working oil supplied to a pilot chamber 31 of the switching valve 30 through a pilot passage 31a from the tilt control valve 60. When the supply of the working oil to the pilot chamber 31 is shut off, the switching valve 30 is held at the shut-off position 30a by a biasing force of the spring 32. When the working oil is supplied to the pilot chamber 31, the switching valve 30 is switched to the communication position 30b against the biasing force of the spring 32 by a pressure in the pilot chamber 31.

The tilt control valve 60 switches the communication and the shut-off between the pilot passage 31a and the neutral passage 13 in the tilt control valve 60 and switches the communication and the shut-off between the pilot passage 31a and the supply passage 14. More specifically, when at the neutral position 60c, the tilt control valve 60 allows the pilot passage 31a and the neutral passage 13 in the tilt control valve 60 to communicate and shuts off the communication between the pilot passage 31a and the supply passage 14. Moreover, when switched to the extended position 60a or the contracted position 60b, the tilt control valve 60 allows the pilot passage 31a and the supply passage 14 to communicate with each other and shuts-off the communication between the pilot passage 31a and the neutral passage 13 in the tilt control valve 60.

A first set pressure value is set for the low-pressure relief valve 40 in advance. The low-pressure relief valve 40 is closed so as to shut off the flow of the working oil when the pressure of an inlet port 41 is at the first set pressure value or less and is opened so as to allow the flow of the working oil when the pressure of the inlet port 41 reaches the first set pressure value.

Since the low-pressure relief passage 17 communicates with the supply passage 14, in a state where the switching valve 30 is switched to the communication position 30b, the pressure in the supply passage 14 is limited to the first set pressure value or less by the low-pressure relief valve 40. Therefore, in this state, the pressure acting on the tilt cylinder 6 is limited to the first set pressure value or less. Similarly, the pressure acting on the lift cylinder 2 is limited to the first set pressure value or less.

In the state where the switching valve 30 is switched to the shut-off position 30a, the communication between the supply passage 14 and the low-pressure relief valve 40 is shut off and thus, the pressure in the supply passage 14 is not limited by the low-pressure relief valve 40. Therefore, in this state, the pressure acting on the lift cylinder 2 can exceed the first set pressure value.

A second set pressure value higher than the first set pressure value is set for the high-pressure relief valve 50 in advance. The high-pressure relief valve 50 is closed so as to shut off the flow of the working oil when the pressure of the inlet port 51 is at the second set pressure value or less and is opened so as to allow the flow of the working oil when the pressure of the inlet port 51 reaches the second set pressure value.

Since the supply passage 14 communicates with the high-pressure relief passage 18 through the upstream side of the lift control valve 20 in the neutral passage 13, in the state where the switching valve 30 is switched to the shut-off position 30a, the pressure in the supply passage 14 is limited to the second set pressure value or less by the high-pressure relief valve 50. Therefore, the pressure acting on the lift cylinder 2 can be set to the second set pressure value or less.

Subsequently, the operation of the fluid pressure control device 100 will be described.

In a state where the lift control valve 20 and the tilt control valve 60 are at the neutral positions 20c and 60c, the working oil from the pump 12 is discharged to the tank 11 through the neutral passage 13. Therefore, the lift cylinder 2 and the tilt cylinder 6 are not operated.

When the tilt control valve 60 is switched to the extended position 60a, the flow of the working oil in the neutral passage 13 is shut off by the tilt control valve 60. At this time, the working oil from the pump 12 is supplied to the anti-rod side chamber 6a of the tilt cylinder 6 through the supply passage 14, the tilt control valve 60, and the first tilt passage 7a, and the working oil in the rod side chamber 6b of the tilt cylinder 6 is discharged to the tank 11 through the second tilt passage 7b, the tilt control valve 60, the return passage 16, and the downstream side of the tilt control valve 60 in and the neutral passage 13. As a result, the tilt cylinder 6 is extended.

Moreover, at this time, the tilt control valve 60 allows the supply passage 14 and the pilot passage 31a to communicate with each other. Thus, the working oil is supplied to the pilot chamber 31 of the switching valve 30, and the switching valve 30 is switched to the communication position 30b. As a result, the flow of the working oil in the low-pressure relief passage 17 is allowed, and the pressure in the supply passage 14 is limited to the first set pressure value or less of the low-pressure relief valve 40. Therefore, the pressure acting on the tilt cylinder 6 is limited to the first set pressure value or less.

When the tilt control valve 60 is switched to the contracted position 60b, the flow of the working oil in the neutral passage 13 is shut off by the tilt control valve 60. At this time, the working oil from the pump 12 is supplied to the rod side chamber 6b of the tilt cylinder 6 through the supply passage 14, the tilt control valve 60, and the second tilt passage 7b, and the working oil in the anti-rod side chamber 6a of the tilt cylinder 6 is discharged to the tank 11 through the first tilt passage 7a, control valve 60 the return passage 16, and the downstream side of the tilt control valve 60 in the neutral passage 13. As a result, the tilt cylinder 6 is contracted.

When the tilt control valve 60 is switched to the contracted position 60b, too, similarly to the case where the tilt control valve 60 is switched to the extended position 60a, the switching valve 30 is switched to the communication position 30b and thus, the pressure in the supply passage 14 is limited to the first set pressure value or less of the low-pressure relief valve 40. Therefore, the pressure acting on the tilt cylinder 6 is limited to the first set pressure value or less.

When the lift control valve 20 is switched to the extended position 20a in the state where the tilt control valve 60 is switched to the extended position 60a or the contracted position 60b, the working oil from the pump 12 is led to the anti-rod side chamber 2a of the lift cylinder 2, and the lift cylinder 2 is extended. Since the tilt control valve 60 is switched to the extended position 60a or the contracted position 60b, the switching valve 30 is switched to the communication position 30b. Thus, the pressure in the supply passage 14 is limited to the first set pressure value or less of the low-pressure relief valve 40. Therefore, the pressure acting on the lift cylinder 2 and the tilt cylinder 6 is limited to the first set pressure value or less.

When the lift control valve 20 is switched to the contracted position 20b in the state where the tilt control valve 60 is switched to the extended position 60a or the contracted position 60b, the working oil in the anti-rod side chamber 2a of the lift cylinder 2 is discharged to the tank 11 through the return passage 15 and the downstream side of the tilt control valve 60 in the neutral passage 13, and the lift cylinder 2 is contracted. Since the switching valve 30 is switched to the communication position 30b, the pressure acting on the tilt cylinder 6 is limited to the first set pressure value or less.

When switched to the neutral position 60c, the tilt control valve 60 allows the pilot passage 31a and the neutral passage 13 to communicate with each other. As a result, the pressure in the pilot chamber 31 of the switching valve 30 lowers to a tank pressure, and the switching valve 30 is switched to the shut-off position 30a by the biasing force of the spring 32. When the switching valve 30 is switched to the shut-off position 30a, the flow of the working oil in the low-pressure relief passage 17 is shut off, and the pressure in the supply passage 14 is not limited to the first set pressure value or less of the low-pressure relief valve 40 anymore. When the lift control valve 20 is switched to the extended position 20a in this state, the pressure exceeding the first set pressure value of the low-pressure relief valve 40 acts on the lift cylinder 2. That is, the lift cylinder 2 can be operated with a pressure at the second set pressure value or less of the high-pressure relief valve 50. Therefore, the lift cylinder 2 can be operated with a stronger force.

As described above, in the fluid pressure control device 100, the pressure exceeding the first set pressure value of the low-pressure relief valve 40 can be made to act on the lift cylinder 2, while the pressure acting on the tilt cylinder 6 can be limited to the first set pressure value or less of the low-pressure relief valve 40. Therefore, pressure resistance of the tilt cylinder 6 does not have to be matched with that of the lift cylinder 2, and a manufacturing cost of the forklift can be reduced.

Subsequently, a structure of the tilt control valve 60 will be described by referring to FIGS. 2 to 9.

Figure 2:
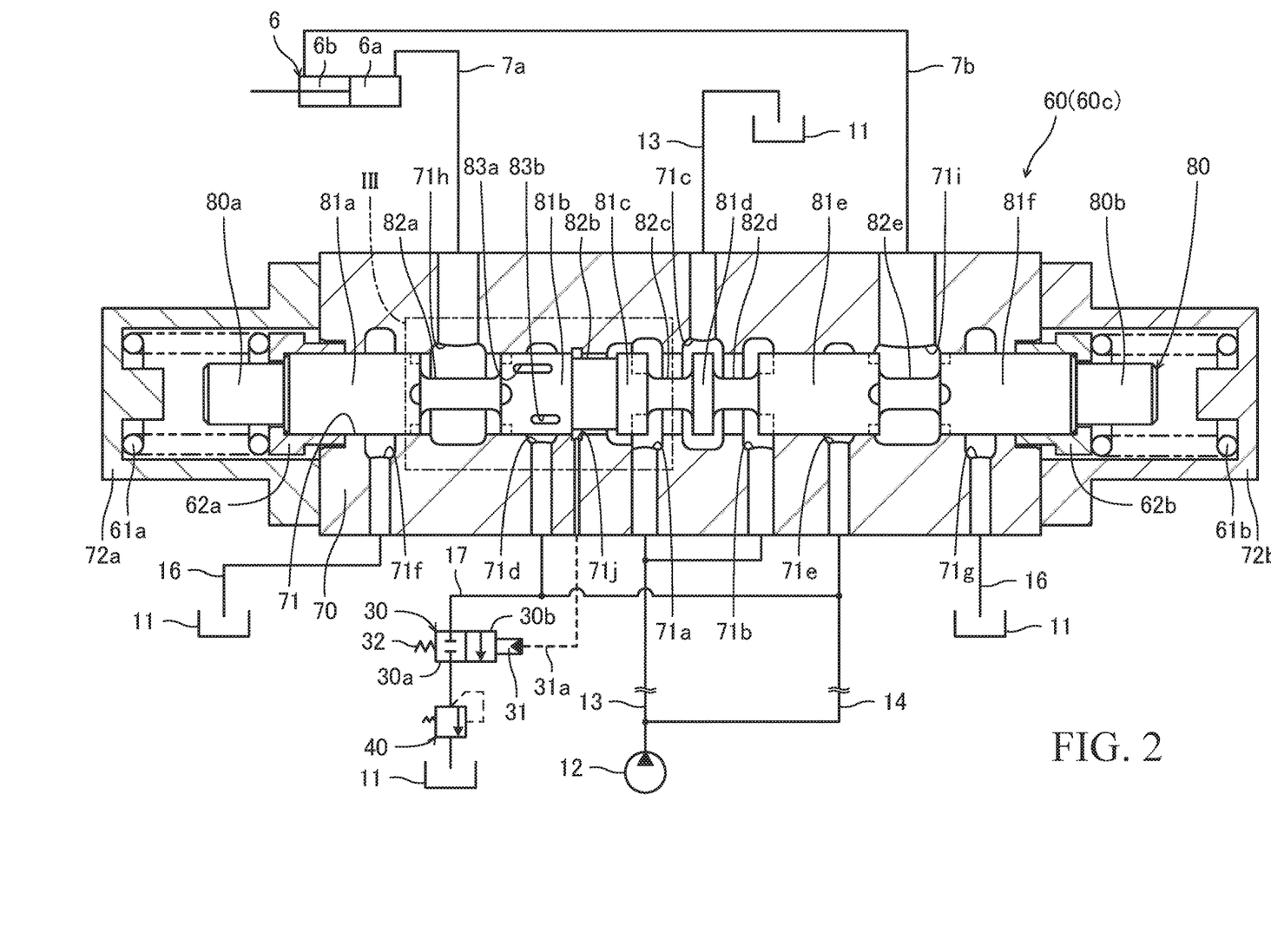
FIG. 2 is a sectional view of a tilt control valve illustrated in FIG. 1 and illustrates a state at a shut-off position.

FIG. 2 is a sectional view of the tilt control valve 60. The tilt control valve 60 has a housing 70, a through hole 71 formed in the housing 70, and a spool 80 slidably inserted in the through hole 71 in the axial direction. In an inner peripheral surface of the through hole 71 of the housing 70, a first and second upstream-side neutral ports 71a and 71b that are connected to the upstream side of the tilt control valve 60 in the neutral passage 13, a downstream-side neutral port 71c that is connected to the downstream side of the tilt control valve 60 in the neutral passage 13, first and second supply ports 71d and 71e that are connected to the supply passage 14, first and second return ports 71f and 71g that are connected to the return passage 16, a first tilt port 71h as a first actuator port that is connected to the first tilt passage 7a, a second tilt port 71i as a second actuator port that is connected to the second tilt passage 7b, and a pilot port 71j that is connected to the pilot passage 31a are formed.

Both end portions 80a and 80b of the spool 80 are accommodated in caps 72a and 72b mounted on the housing 70, respectively. The caps 72a and 72b are formed cylindrically with bottoms, bottom surfaces of the caps 72a and 72b are faced with the both end portions 80a and 80b of the spool 80, and a movement range of the spool 80 is defined by the caps 72a and 72b.

A centering spring 61a and a spring receiver 62a are accommodated inside the cap 72a. A hole is formed in the spring receiver 62a, and an end portion 80a of the spool 80 is inserted into this hole. The centering spring 61a is provided in a state compressed between the bottom surface of the cap 72a and the spring receiver 62a. When the spool 80 receives a force from the outside and moves in a direction contracting the centering spring 61a (left direction in FIG. 2), the tilt control valve 60 is switched to the contracted position 60b. In a state where the movement of the spool 80 is limited by the cap 72a, the center spring 61a is in the most contracted state.

A centering spring 61b and a spring receiver 62b are accommodated inside the cap 72b. A hole is formed in the spring receiver 62b, and an end portion 80b of the spool 80 is inserted into this hole. The centering spring 61b is provided in the state compressed between the bottom surface of the cap 72b and the spring receiver 62b. When the spool 80 receives a force from the outside and moves in a direction contracting the centering spring 61b (right direction in FIG. 2), the tilt control valve 60 is switched to the extended position 60a. In the state where the movement of the spool 80 is limited by the cap 72b, the center spring 61b is in the most contracted state.

The spool 80 has first, second, third, fourth, fifth, and sixth land portions 81a, 81b, 81c, 81d, 81e, 81f in sliding contact with the inner peripheral surface of the through hole 71 of the housing 70. The first, second, third, fourth, fifth, and sixth land portions 81a, 81b, 81c, 81d, 81e, 81f are formed in this order from the one end portion 80a to the other end portion 80b of the spool 80 at intervals. The second land portion 81b corresponds to a "land portion" in claims.

A first annular groove 82a is formed between the first and second land portions 81a and 81b. Similarly, second, third, fourth, and fifth annular grooves 82b, 82c, 82d, and 82e are formed between the second and third land portions 81b and 81c, between the third and fourth land portions 81c and 81d, between the fourth and fifth land portions 81d and 81e, and between the fifth and sixth land portions 81e and 81f, respectively.

In a state where the spool 80 is at the neutral position 60c (see FIG. 2), the third annular groove 82c of the spool 80 allows the first upstream-side neutral port 71a and the downstream-side neutral port 71c to communicate with each other, and the fourth annular groove 82d allows the second upstream-side neutral port 71b and the downstream-side neutral port 71c to communicate with each other. The second land portion 81b shuts off the communication between the first supply port 71d and the first tilt port 71h, and the fifth land portion 81e shuts off the communication between the second supply port 71e and the second tilt port 71i. The first land portion 81a shuts off the communication between the first return port 71f and the first tilt port 71h, and the sixth land portion 81f shuts off the communication between the second return port 71g and the second tilt port 71i. That is, at the neutral position 60c, the spool 80 allows the flow of the working oil in the neutral passage 13, while shuts off the flow of the working oil supplied to/discharged from the tilt cylinder 6. Therefore, the tilt cylinder 6 is stopped.

When the spool 80 is moved to the right direction in FIG. 2 and is switched to the extended position 60a, the third land portion 81c of the spool 80 shuts off the communication between the first upstream-side neutral port 71a and the downstream-side neutral port 71c, and the fourth land portion 81d shuts off the communication between the second upstream-side neutral port 71b and the downstream-side neutral port 71c. The first annular groove 82a allows the first supply port 71d and the first tilt port 71h to communicate with each other, and the fifth annular groove 82e allows the second return port 71g and the second tilt port 71i to communicate with each other. As a result, the working oil from the pump 12 is supplied to the anti-rod side chamber 6a of the tilt cylinder 6, and the working oil is discharged to the tank 11 from the rod side chamber 6b, and the tilt cylinder 6 is extended.

When the spool 80 is moved to the left direction in FIG. 2 and is switched to the contracted position 60b, the fourth land portion 81d of the spool 80 shuts off the communication between the first upstream-side neutral port 71a and the downstream-side neutral port 71c, and the fifth land portion 81e shuts off the communication between the second upstream-side neutral port 71b and the downstream-side neutral port 71c. The first annular groove 82a allows the first return port 71f and the first tilt port 71h to communicate with each other, and the fifth annular groove 82e allows the second supply port 71e and the second tilt port 71i to communicate with each other. As a result, the working oil from the pump 12 is supplied to the rod side chamber 6b of the tilt cylinder 6, and the working oil is discharged to the tank 11 from the anti-rod side chamber 6a, and the tilt cylinder 6 is contracted.

Figure 3:
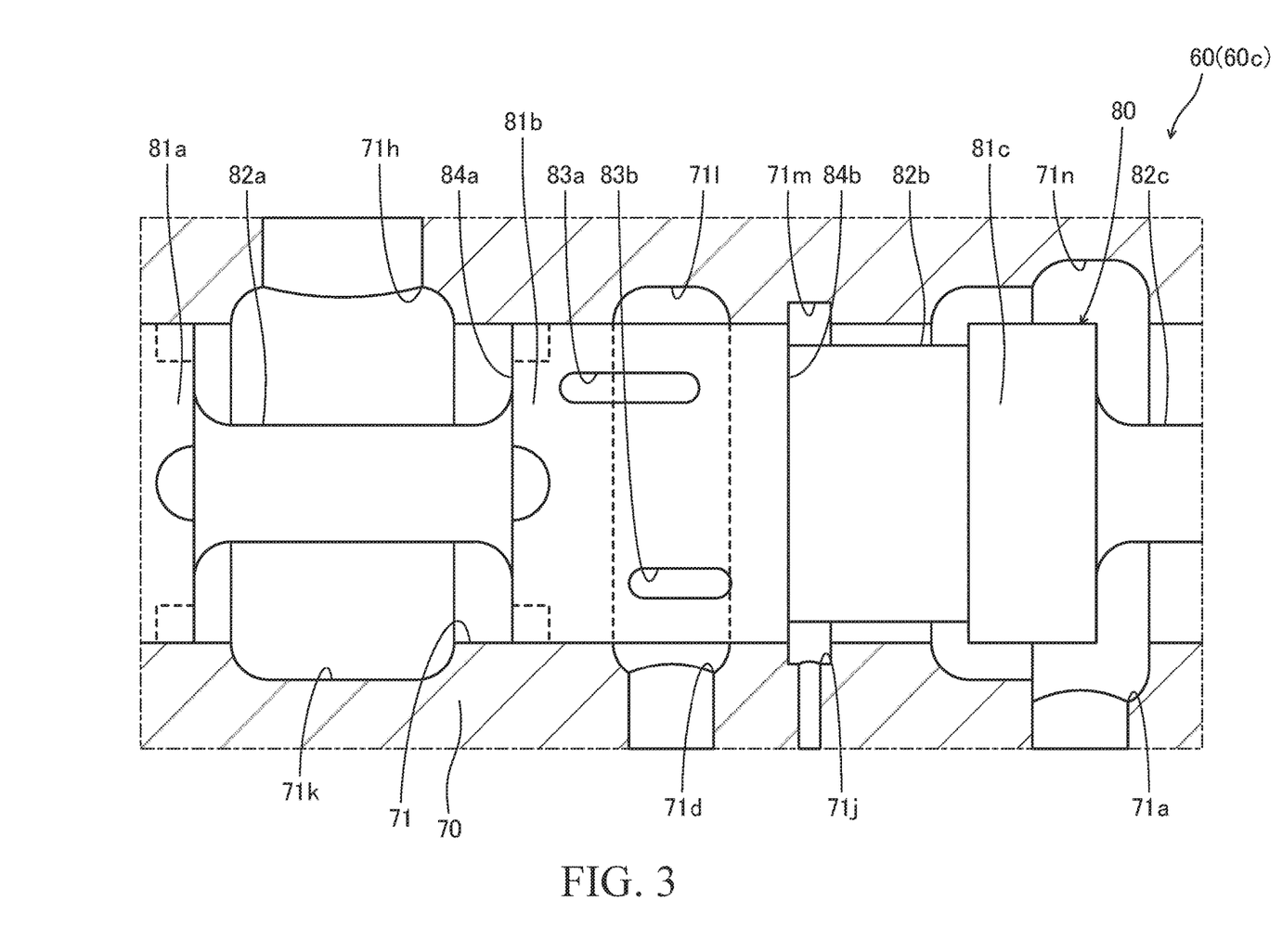
FIG. 3 is an enlarged sectional view of a III part illustrated in FIG. 2.
Figure 4:
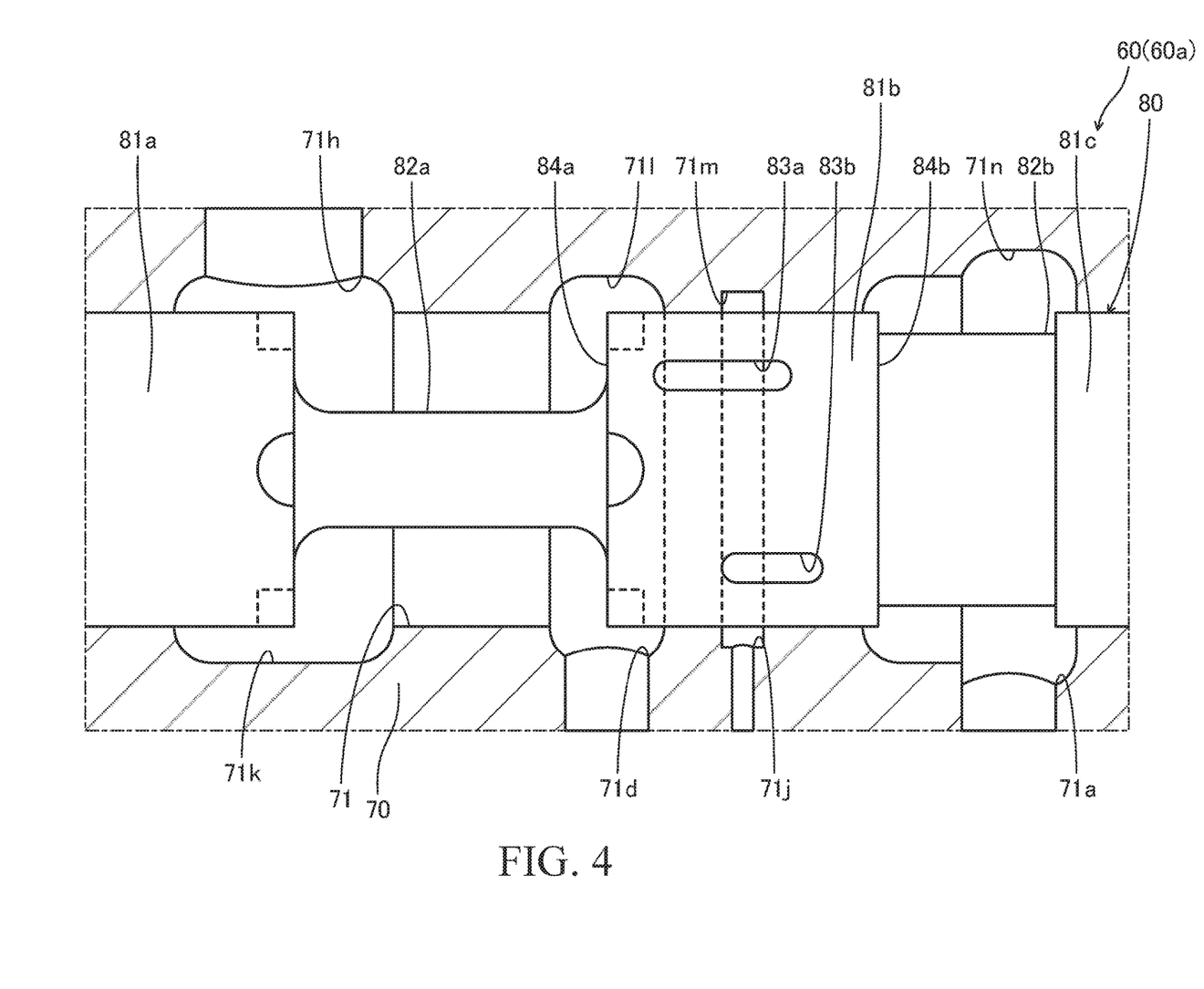
FIG. 4 is an enlarged sectional view of the tilt control valve and illustrates a state switched to an extension position correspondingly to FIG. 3.
Figure 5:
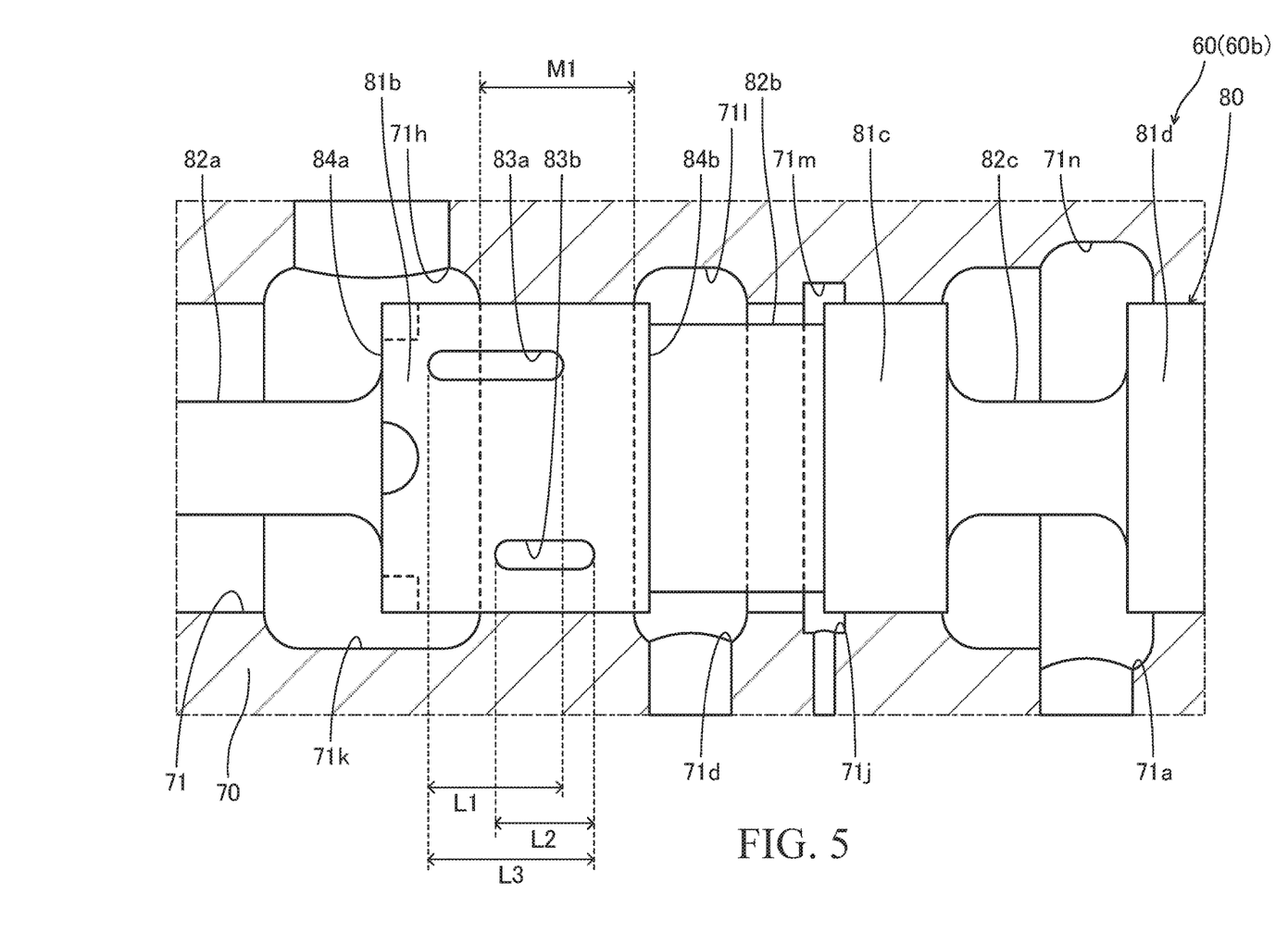
FIG. 5 is an enlarged sectional view of the tilt control valve and illustrates a state switched to a contraction position correspondingly to FIG. 3.

As illustrated in FIGS. 3, 4, and 5, the first tilt port 71h, the first supply port 71d, the pilot port 71j, and the first upstream-side neutral port 71a is formed on bottom surfaces of annular grooves 71k, 71l, 71m, and 71n provided on an inner periphery of the through hole 71 of the housing 70, respectively. On an outer peripheral surface of the second land portion 81b, first and second grooves 83a and 83b as grooves along the axial direction of the spool 80 are formed. The first and second grooves 83a and 83b are formed so as not to be opened in both end surfaces 84a and 84b of the second land portion 81b.

When the spool 80 is at the neutral position 60c (see FIG. 3), the pilot port 71j communicates with the downstream-side neutral port 71c through the second annular groove 82b of the spool 80, the annular groove 71n of the through hole 71, and the third annular groove 82c of the spool 80. Thus, the pressure in the pilot chamber 31 of the switching valve 30 becomes substantially equal to the tank pressure. As a result, the switching valve 30 is held at the shut-off position 30a by the biasing force of the spring 32.

When the spool 80 is moved to the right direction in FIG. 3 and is switched to the extended position 60a (see FIG. 4), the second land portion 81b shuts off the communication between the pilot port 71j and the first upstream-side neutral port 71a, while the first groove 83a of the second land portion 81b allows the first supply port 71d and the pilot port 71j to communicate with each other. Thus, the working oil from the pump 12 is led to the pilot chamber 31 of the switching valve 30 through the first supply port 71d, the first groove 83a, and the pilot port 71j. As a result, the pressure in the pilot chamber 31 rises, and the switching valve 30 is switched to the communication position 30b against the biasing force of the spring 32.

When the spool 80 is moved to the left direction in FIG. 3 and is switched to the contracted position 60b (see FIG. 5), the third land portion 81c shuts off the communication between the pilot port 71j and the first upstream-side neutral port 71a, and the second annular groove 82b allows the first supply port 71d and the pilot port 71j to communicate with each other. Thus, similarly to the case where the tilt control valve 60 is switched to the extended position 60a, the working oil from the pump 12 is led to the pilot chamber 31 of the switching valve 30, and the switching valve 30 is switched to the communication position 30b against the biasing force of the spring 32.

As described above, in the tilt control valve 60, the second land portion 81b of the spool 80 allows the first supply port 71d and the pilot port 71j to communicate with each other both at the extended position 60a and the contracted position 60b. Thus, when the working oil is led from the second supply port 71e to the second tilt port 71i, too, the working oil from the pump 12 is led to the pilot chamber 31 of the switching valve 30 from the first supply port 71d having the same pressure as that of the second supply port 71e through the pilot port 71j. Therefore, the working oil can be supplied to the pilot chamber 31 from the supply passage 14 both at the extended position 60a and at the contracted position 60b without providing a port configured to lead the working oil from the pump 12 to the pilot chamber 31 through the second supply port 71e in the housing 70.

Moreover, in the tilt control valve 60, the flow of the working oil between the first supply port 71d and the pilot port 71j is controlled by the second land portion 81b that controls the flow of the working oil between the first supply port 71d and the first tilt port 71h. Therefore, the number of land portions in the spool 80 can be reduced.

Figure 6:
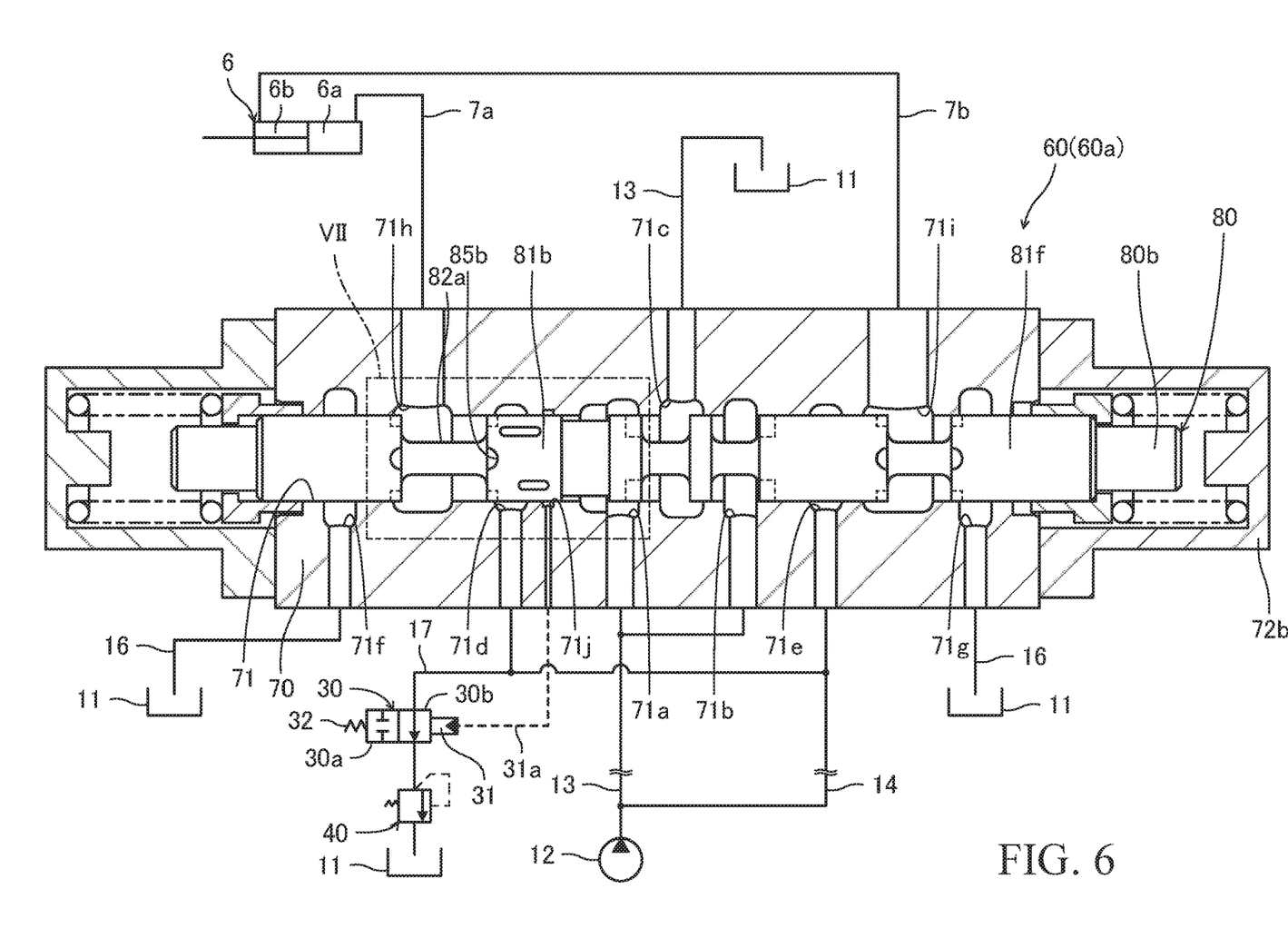
FIG. 6 is a sectional view of the tilt control valve illustrated in FIG. 1 and illustrates a state where the spool is switched to a throttle extension state.
Figure 7:
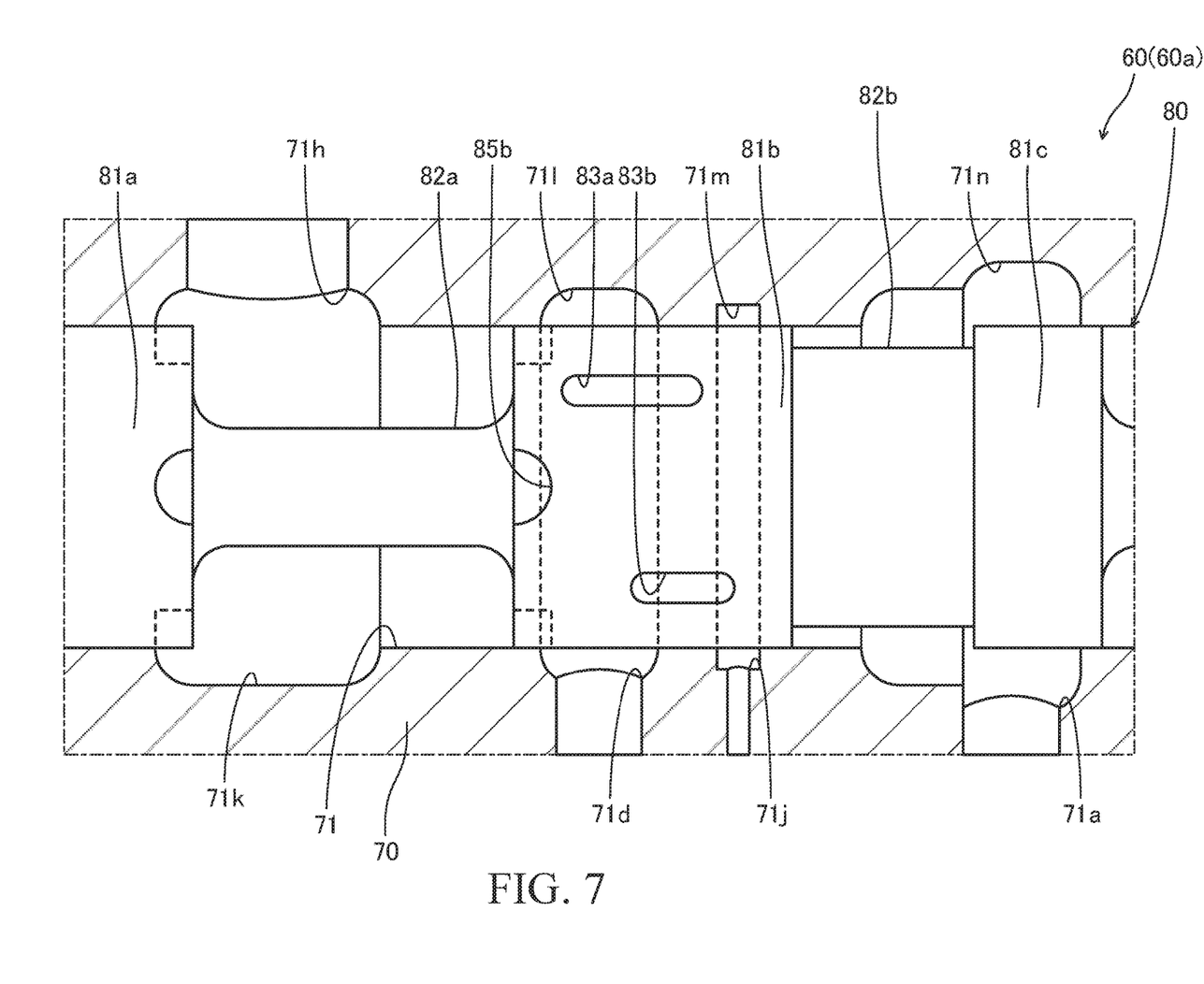
FIG. 7 is an enlarged sectional view of a VII part illustrated in FIG. 6.

FIG. 6 is a sectional view of the tilt control valve 60 and illustrates a state where the spool 80 is switched to the extended position 60a without moving the spool 80 to the maximum. FIG. 7 is an enlarged sectional view of a VII part illustrated in FIG. 6.

In the state illustrated in FIG. 6, though the spool 80 has been switched to the extended position 60a, the end portion 80b of the spool 80 is not in contact with the cap 72b. In this state, the first supply port 71d and the first tilt port 71h communicate with each other by a notch 85b as a throttle portion formed in the second land portion 81b. The notch 85b throttles the flow of the working oil between the first supply port 71d and the first tilt port 71h at the extended position 60a. In the following, a state where the flow of the working oil is throttled as illustrated in FIGS. 6 and 7 is also called a "throttle extended state (throttled state)", and a state where the spool 80 is further moved to the right direction in FIG. 6 from the throttle extended state, and the throttling by the notch 85b is released (see FIG. 4) is also called an "open extended state (open state)".

The spool 80 throttles the flow of the working oil by the notch 85b in the throttle extended state. Thus, a flowrate of the working oil that is led to the anti-rod side chamber 6a of the tilt cylinder 6 through the first supply port 71d and the first tilt port 71h from the pump 12 is smaller than the flowrate of the working oil in the open extended state. Therefore, the tilt cylinder 6 is extended at a low speed.

As illustrated in FIG. 7, the second groove 83b of the second land portion 81b allows the first supply port 71d and the pilot port 71j to communicate with each other in the throttle extended state. Thus, even when the flow of the working oil between the first supply port 71d and the first tilt port 71h is throttled, the working oil from the pump 12 is led to the pilot chamber 31 (see FIGS. 1 and 6) through the first supply port 71d, the second groove 83b, and the pilot port 71j. Therefore, the switching valve 30 can be switched to the communication position 30b while the tilt cylinder 6 is extended at a low speed.

Figure 8:
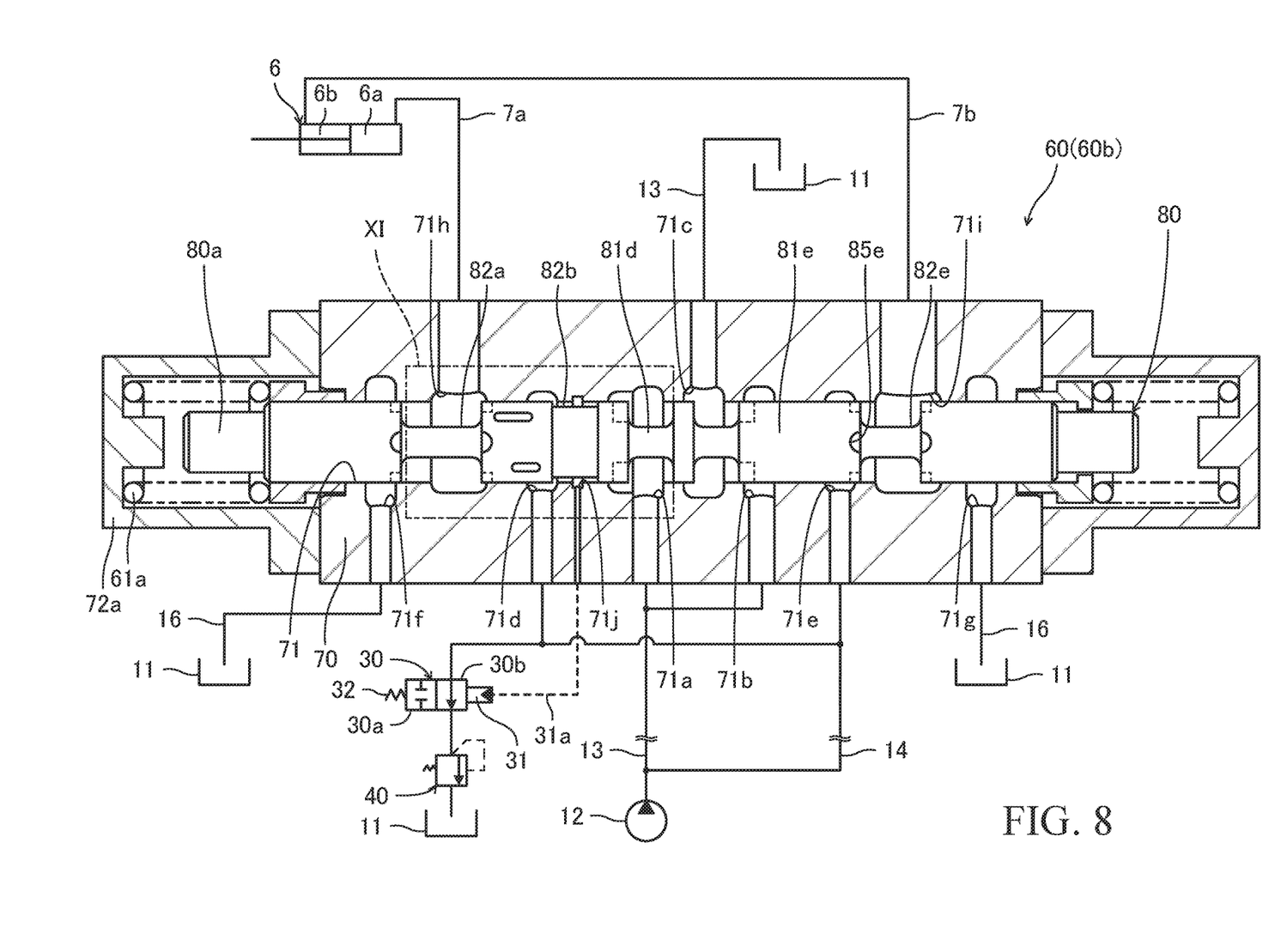
FIG. 8 is a sectional view of the tilt control valve illustrated in FIG. 1 and illustrates a state where the spool is switched to a throttle contraction state.
Figure 9:
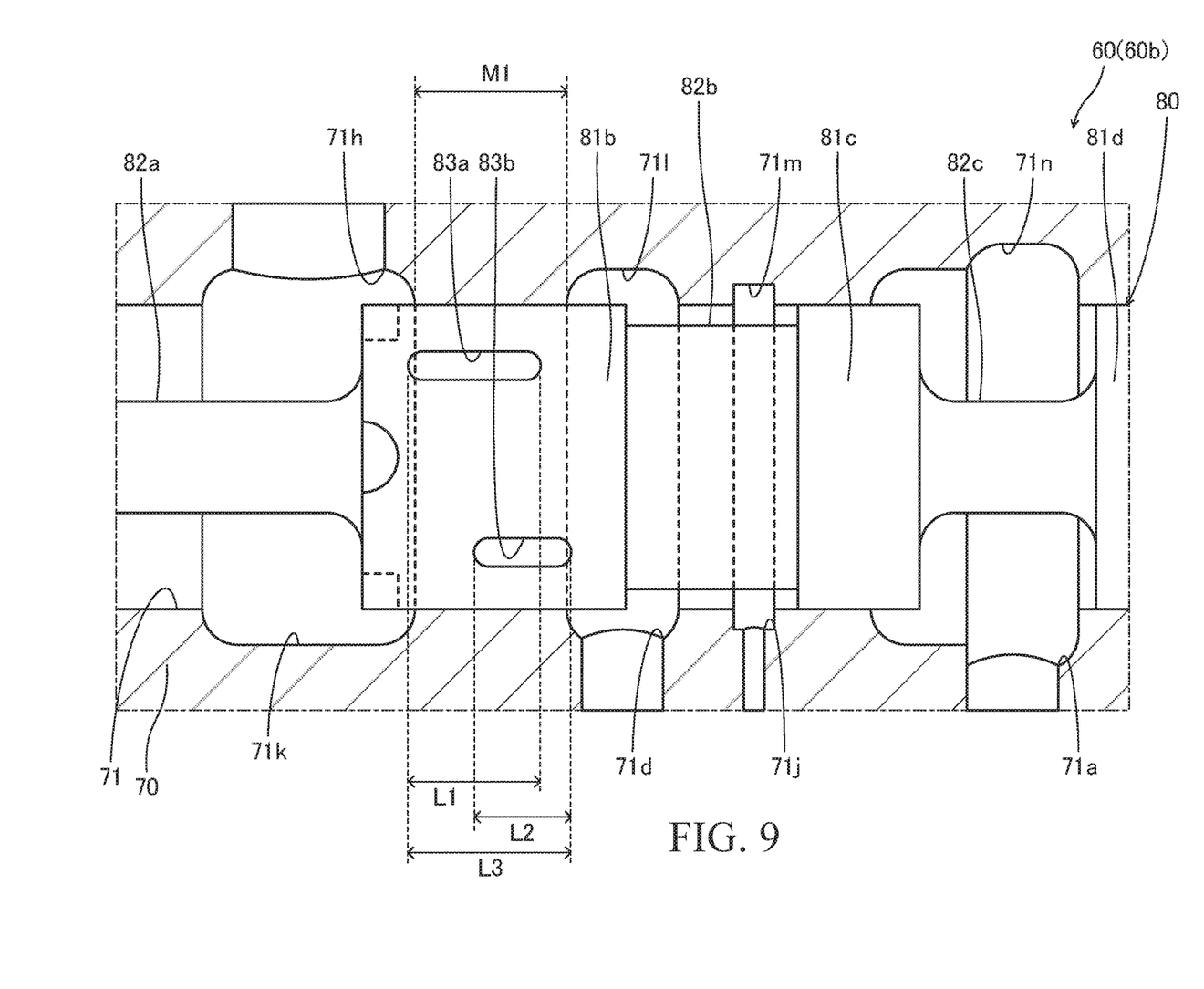
FIG. 9 is an enlarged sectional view of a IX part illustrated in FIG. 8.

FIG. 8 is a sectional view of the tilt control valve 60 and illustrates a state where the spool 80 is switched to the contracted position 60b without moving the spool 80 to the maximum. FIG. 9 is an enlarged sectional view of a IX part illustrated in FIG. 8.

In the state illustrated in FIG. 8, though the spool 80 is switched to the contracted position 60b, the end portion 80a of the spool 80 is not in contact with the cap 72a. In this state, the second supply port 71e and the second tilt port 71i communicate with each other by a notch 85e formed in the fifth land portion 81e. The notch 85e throttles the flow of the working oil between the second supply port 71e and the second tilt port 71i at the contracted position 60b. In the following, a state where the flow of the working oil is throttled as illustrated in FIGS. 8 and 9 is also called a "throttle contracted state", and a state where the spool 80 is further moved to the left direction in FIG. 8 from the throttle contracted state, and the throttling by the notch 85e is released (see FIG. 5) is also called an "open contracted state".

The spool 80 throttles the flow of the working oil by the notch 85e in the throttle contracted state. Thus, the flowrate of the working oil that is led to the rod side chamber 6b of the tilt cylinder 6 through the second supply port 71e and the second tilt port 71i from the pump 12 is smaller than the flowrate of the working oil in the open contracted state. Therefore, the tilt cylinder 6 is contracted at a low speed.

As illustrated in FIG. 9, the second annular groove 82b of the spool 80 allows the first supply port 71d and the pilot port 71j to communicate with each other in the throttle contracted state. Thus, even when the flow of the working oil between the second supply port 71e and the second tilt port 71i is throttled as illustrated in FIG. 8, the working oil from the pump 12 is led to the pilot chamber 31 through the first supply port 71d, the second annular groove 82b, and the pilot port 71j. Therefore, the switching valve 30 can be switched to the communication position 30b while the tilt cylinder 6 is contracted at a low speed.

As illustrated in FIGS. 5 and 9, an interval M1 between the annular groove 71k and the annular groove 71l is larger than a length L1 of the first groove 83a and a length L2 of the second groove 83b, and the first and second grooves 83a and 83b are shut off from at least one of the first supply port 71d and the first tilt port 71h at the contracted position 60b. That is, in both the open contracted state and the throttle contracted state, the communication between the first supply port 71d and the first tilt port 71h is shut off by the second land portion 81b. Therefore, the interval M1 can be narrowed so as to narrow an interval between the first supply port 71d and the first tilt port 71h without allowing the first supply port 71d and the first tilt port 71h to communicate with each other at the contracted position 60b, whereby a size of the housing 70 can be reduced.

In a structure where the first groove 83a and the second groove 83b communicate with each other at the contracted position 60b, for example, the interval M1 between the annular groove 71k and the annular groove 71l needs to be larger than a length L3 from the end of the first groove 83a to the end of the second groove 83b. That is because, if the interval M1 is less than the length L3, the first supply port 71d and the first tilt port 71h communicate with each other through the first groove 83a and the second groove 83b in the throttle contracted state (see FIG. 9). From the reason described above, the interval M1 between the annular groove 71k and the annular groove 71l cannot be made less than the length L3. Thus, the interval between the first supply port 71d and the first tilt port 71h cannot be narrowed, and the size of the housing 70 cannot be reduced.

In the tilt control valve 60, the first groove 83a and the second groove 83b are formed so as not to communicate with each other at the contracted position 60b and is shut off from at least either one of the first supply port 71d and the first tilt port 71h. Thus, even if the interval M1 is at the length L3 or less, the communication between the first supply port 71d and the first tilt port 71h is shut off by the second land portion 81b. Therefore, the interval between the first supply port 71d and the first tilt port 71h can be narrowed by narrowing the interval M1 without allowing the first supply port 71d and the first tilt port 71h to communicate with each other at the contracted position 60b. As a result, the size of the housing 70 can be reduced.

The interval M1 between the annular groove 71k and the annular groove 71l is larger than the length L1 of the first groove 83a and the length L2 of the second groove 83b. Thus, for a period of time until the spool 80 is switched to the open contracted state of the contracted position 60b from the neutral position 60c, the communication between the first supply port 71d and the first tilt port 71h is shut off by the second land portion 81b of the spool 80.

As illustrated in FIGS. 4 and 7, a part of the second groove 83b is overlapped with the first groove 83a in the axial direction of the spool 80. Thus, at switching between the throttle extended state (see FIG. 7) and the open extended state (see FIG. 4), at least either one of the first groove 83a and the second groove 83b allows the first supply port 71d and the pilot port 71j to communicate with each other without fail. Therefore, when the spool 80 is moved to the right direction in FIG. 7 from the throttle extended state illustrated in FIG. 7 and is switched to the open extended state illustrated in FIG. 4 or in the case contrary to that, the working oil can be continuously supplied to the pilot chamber 31 of the switching valve 30.

According to the aforementioned embodiment, the following effects are exerted.

In the tilt control valve 60, the working oil can be supplied to the pilot chamber 31 both at the extended position 60a and the contracted position 60b without providing a port configured to lead the working oil from the pump 12 to the pilot chamber 31 of the switching valve 30 through the second supply port 71e in the housing 70. As a result, the number of ports in the housing 70 can be reduced, and the size of the housing 70 can be reduced.

Moreover, in the tilt control valve 60, the second land portion 81b of the spool 80 controls the flow of the working oil between the first supply port 71d and the first tilt port 71h and controls the flow of the working oil between the first supply port 71d and the pilot port 71j. Therefore, the number of land portions in the spool 80 can be reduced, and the sizes of the spool 80 and the housing 70 can be reduced. As a result, the size of the tilt control valve 60 can be reduced.

Moreover, in the tilt control valve 60, the second groove 83b of the second land portion 81b allows the first supply port 71d and the pilot port 71j to communicate with each other at the throttle extended state. Thus, even when the flow of the working oil led to the first tilt port 71h from the first supply port 71d is throttled, the working oil from the pump 12 is led to the pilot port 71j through the first supply port 71d and the second groove 83b. Therefore, the switching valve 30 can be switched to the communication position 30b by supplying the working oil to the pilot chamber 31 of the switching valve 30, while the tilt cylinder 6 is operated at a low speed.

Moreover, in the tilt control valve 60, in both the throttle contracted state and the open contracted state, the first groove 83a is shut off from the first supply port 71d, and the second groove 83b is shut off from the first tilt port 71h. Thus, even in a state where the first groove 83a communicates with the first tilt port 71h, and the second groove 83b communicates with the first supply port 71d at the contracted position 60b, the communication between the first supply port 71d and the first tilt port 71h is shut off by the second land portion 81b. Therefore, the interval between the first supply port 71d and the first tilt port 71h can be narrowed without allowing the first supply port 71d and the first tilt port 71h to communicate with each other at the contracted position 60b. As a result, the size of the housing 70 can be reduced, and the size of the tilt control valve 60 can be reduced.

Moreover, in the tilt control valve 60, a part of the second groove 83b is overlapped with the first groove 83a in the axial direction of the spool 80. Thus, at switching between the throttle extended state and the open extended state, at least either one of the first groove 83a and the second groove 83b allows the first supply port 71d and the pilot port 71j to communicate with each other without fail. Therefore, when the spool 80 is switched from the throttle extended state to the open extended state or in the case contrary to that, the working oil can be continuously supplied to the pilot chamber 31 of the switching valve 30, and the switching valve 30 can be held at the communication position 30b.

Moreover, in the tilt control valve 60, the spool 80 shuts off the communication between the first supply port 71d and the pilot port 71j at the neutral position 60c. Thus, when the spool 80 is at the neutral position 60c, the flow of the working oil between the first supply port 71d and the pilot port 71j is shut off. Therefore, the supply of the working oil to the pilot chamber 31 of the switching valve 30 can be shut off when the supply of the working oil to the tilt cylinder 6 is shut off, and the switching valve 30 can be returned to the shut-off position 30a.

Moreover, in the tilt control valve 60, the spool 80 allows the pilot port 71j and the downstream-side neutral port 71c to communicate with each other at the neutral position 60c. Thus, when the spool 80 is at the neutral position 60c, the pilot port 71j communicates with the tank 11 through the downstream-side neutral port 71c. Therefore, the pressure in the pilot chamber 31 of the switching valve 30 can be lowered to the tank pressure with the shut-off of the supply of the working oil to the tilt cylinder 6, and the switching valve 30 can be switched to the shut-off position 30a.

Hereinafter, the constitution, actions, and effects of the embodiment of the present invention will be described in summary.

This embodiment relates to the tilt control valve 60 that controls the flow of the working oil from the pump 12 to the tilt cylinder 6 and that controls the flow of the working oil from the pump 12 to the pilot chamber 31 of the switching valve 30. The tilt control valve 60 includes the housing 70 formed with the first and second supply ports 71d and 71e, the first and second tilt ports 71h and 71i, and the pilot port 71j, the first and second supply ports 71d and 71e being connected to the pump 12, the first and second tilt ports 71h and 71i being connected to the tilt cylinder 6, the pilot port 71*j* being connected to the pilot chamber 31 and the spool 80 accommodated in the housing 70 slidably in the axial direction, the spool being configured to switch between the extended position 60*a* where the first supply port 71*d* and the first tilt port 71*h* communicate with each other and the contracted position 60*b* where the second supply port 71*e* and the second tilt port 71*i* communicate with each other, and the spool 80 is configured to allow the first supply port 71*d* and the pilot port 71*j* to communicate with each other both at the extended position 60*a* and the contracted position 60*b*.

In this constitution, even when the working oil is led to the second tilt port 71*i* from the second supply port 71*e*, the working oil from the pump 12 is led to the pilot port 71*j* through the first supply port 71*d*. Therefore, the working oil can be supplied to the pilot chamber 31 both at the extended position 60*a* and the contracted position 60*b* without providing a port configured to lead the working oil from the pump 12 to the pilot chamber 31 through the second supply port 71*e* in the housing 70. As a result, the number of ports in the housing 70 can be reduced, and the size of the housing 70 can be reduced.

Moreover, in the tilt control valve 60, the spool 80 has the second land portion 81*b* configured to allow the first supply port 71*d* and the first tilt port 71*h* to communicate with each other at the extended position 60*a* and to shut off the communication between the first supply port 71*d* and the first tilt port 71*h* at the contracted position 60*b*, and the second land portion 81*b* is configured to allow the first supply port 71*d* and the pilot port 71*j* to communicate with each other both at the extended position 60*a* and the contracted position 60*b*.

In this constitution, the flow of the working oil between the first supply port 71*d* and the pilot port 71*j* is controlled by the second land portion 81*b* configured to control the flow of the working oil between the first supply port 71*d* and the first tilt port 71*h*. Therefore, the number of land portions in the spool 80 can be reduced, and the sizes of the spool 80 and the housing 70 can be reduced. As a result, the size of the tilt control valve 60 can be reduced.

Moreover, in the tilt control valve 60, the second land portion 81*b* is formed with the first and second grooves 83*a* and 83*b* configured to allow the first supply port 71*d* and the pilot port 71*j* to communicate with each other at the extended position 60*a*.

In this constitution, the flow of the working oil between the first supply port 71*d* and the pilot port 71*j* is controlled only by the second land portion 81*b* in which the first and second grooves 83*a* and 83*b* are formed. Therefore, the number of land portions in the spool 80 can be reduced, and the sizes of the spool 80 and the housing 70 can be reduced. As a result, the size of the control valve can be reduced.

Moreover, in the tilt control valve 60, the spool 80 is, at the extended position 60*a*, configured to switch between the throttle extended state where the flow of the working oil between the first supply port 71*d* and the first tilt port 71*h* is throttled and the open extended state where the throttle is released, and the first and second grooves 83*a* and 83*b* allow the first supply port 71*d* and the pilot port 71*j* to communicate with each other in the throttle extended state and the open extended state.

In this constitution, even when the flow of the working oil between the first supply port 71*d* and the first tilt port 71*h* is throttled, the working oil from the pump 12 is led to the pilot port 71*j* through the first supply port 71*d* and the second groove 83*b*. Therefore, the working oil can be supplied to the pilot chamber 31 of the switching valve 30 while the tilt cylinder 6 is operated at a low speed.

Moreover, in the tilt control valve 60, the first groove 83*a* is configured to allow the first supply port 71*d* and the pilot port 71*j* to communicate with each other in the open extended state, while the second groove 83*b* is configured to allow the first supply port 71*d* and the pilot port 71*j* to communicate with each other in the throttle extended state, and the first groove 83*a* is shut off from the first supply port 71*d*, and the second groove 83*b* is shut off from the first tilt port 71*h* at the contracted position 60*b*.

In this constitution, even in the state where the first groove 83*a* communicates with the first tilt port 71*h*, and the second groove 83*b* communicates with the first supply port 71*d*, the communication between the first supply port 71*d* and the first tilt port 71*h* is shut off at the contracted position 60*b*. Therefore, the interval between the first supply port 71*d* and the first tilt port 71*h* can be narrowed without allowing the first supply port 71*d* and the first tilt port 71*h* to communicate with each other at the contracted position 60*b*. As a result, the size of the housing 70 can be reduced, and the size of the tilt control valve 60 can be reduced.

Moreover, in the tilt control valve 60, the first groove 83*a* and the second groove 83*b* are provided by being separated from each other in the circumferential direction, and a part of the second groove 83*b* is overlapped with a part of the first groove 83*a* in the axial direction of the spool 80.

In this constitution, at switching in the middle of the throttle extended state and the open extended state, at least either one of the first groove 83*a* and the second groove 83*b* allows the first supply port 71*d* and the pilot port 71*j* to communicate with each other without fail. Therefore, when the spool 80 is switched from the throttle extended state to the open extended state or in the case contrary to that, the working oil can be continuously supplied to the pilot chamber 31 of the switching valve 30.

Moreover, in the tilt control valve 60, the spool 80 is configured to be switched to the neutral position 60*c* where the communication between the first supply port 71*d* and the first tilt port 71*h* is shut off and the communication between the second supply port 71*e* and the second tilt port 71*i* is shut off and to shut off the communication between the first supply port 71*d* and the pilot port 71*j* at the neutral position 60*c*.

In this constitution, when the spool 80 is at the neutral position 60*c*, the flow of the working oil between the first supply port 71*d* and the pilot port 71*j* is shut off. Therefore, when the supply of the working oil to the tilt cylinder 6 is shut off, the supply of the working oil to the pilot chamber 31 of the switching valve 30 can be shut off.

Moreover, in the tilt control valve 60, the housing 70 is formed further with the downstream-side neutral port 71*c* connected to the tank 11, and the spool 80 is configured to allow the communication between the pilot port 71*j* and the downstream-side neutral port 71*c* at the neutral position 60*c*.

In this constitution, when the spool 80 is at the neutral position 60*c*, the pilot port 71*j* communicates with the tank 11 through the downstream-side neutral port 71*c*. Therefore, the pressure in the pilot chamber 31 of the switching valve 30 can be made the tank pressure with the shut-off of the supply of the working oil to the tilt cylinder 6.

Although the embodiment of the present invention has been described above, the above embodiment is merely an illustration of one exemplary application of the present invention and is not intended to limit the technical scope of the present invention to the specific configuration of the above embodiment.

In the tilt control valve 60, the first supply port 71*d* and the pilot port 71*j* communicate with each other by the first groove 83*a* at the extended position 60*a*. The first supply port 71*d* and the pilot port 71*j* may communicate with each other by an annular groove, instead of the first groove 83*a*.

In the tilt control valve 60, the first supply port 71*d* and the pilot port 71*j* communicate with each other by the second annular groove 82*b* at the contracted position 60*b*. The first supply port 71*d* and the pilot port 71*j* may communicate with each other by a linear groove formed in the land portion, instead of the second annular groove 82*b*.

In the tilt control valve 60, the spool 80 allows the first supply port 71*d* and the pilot port 71*j* to communicate with each other both at the extended position 60*a* and the contracted position 60*b*. The spool 80 may allow the second supply port 71*e*, instead of the first supply port 71*d*, and the pilot port 71*j* to communicate with each other both at the extended position 60*a* and the contracted position 60*b*.

The tilt control valve 60 controls the operation of the tilt cylinder 6. The present invention can be applied to the lift control valve 20 or can be applied to a control valve that controls operations of other hydraulic cylinders. Moreover, the present invention can be also applied to a control valve that controls operations of other actuators such as a hydraulic motor.

The tilt control valve 60 controls the flow of the working oil to the pilot chamber 31 of the switching valve 30 in the fluid pressure control device 100 mounted on the forklift. The present invention can be also applied to a control valve that controls the flow of the working oil to a pilot chamber of another fluid pressure device such as a switching valve mounted on a power shovel.

The tilt control valve 60 and the fluid pressure control device 100 according to the aforementioned embodiment uses the working oil as the working fluid but may use a non-compressive fluid such as water, an aqueous solution and the like instead of the working oil.

The present application claims a priority based on Japanese Patent Application No. 2018-3645 filed with the Japan Patent Office on Jan. 12, 2018, and all the contents of this application are incorporated herein by reference.

The invention claimed is:

1. A control valve that controls a flow of a working fluid from a pump to an actuator and that controls the flow of the working fluid from the pump to a pilot chamber of another fluid pressure device, comprising:
    a housing having first and second supply ports, first and second actuator ports, and a pilot port, the first and second supply ports being connected to the pump, the first and second actuator ports being connected to the actuator, the pilot port being connected to the pilot chamber; and
    a spool accommodated slidably in an axial direction in the housing, the spool being configured to be switched between a first communication position where the first supply port and the first actuator port are allowed to communicate with each other and a second communication position where the second supply port and the second actuator port are allowed to communicate with each other, wherein
    the spool is configured to allow the first supply port and the pilot port to communicate with each other at both the first communication position and the second communication position, and
    the spool is configured to be switchable from the first or second communication position to a neutral position where the communication between the first supply port and the first actuator port is shut off and the communication between the second supply port and the second actuator port is shut off, and to shut off the communication between the first supply port and the pilot port at the neutral position.

2. The control valve according to claim 1, wherein
    the spool has a land portion and is configured to allow the first supply port and the first actuator port to communicate with each other at the first communication position and to shut off the communication between the first supply port and the first actuator port at the second communication position; and
    the land portion is configured to allow the first supply port and the pilot port to communicate with each other at both the first communication position and the second communication position.

3. The control valve according to claim 2, wherein
    the land portion has a groove configured to allow the first supply port and the pilot port to communicate with each other at the first communication position.

4. The control valve according to claim 3, wherein
    the spool is, at the first communication position, configured to switch between a throttle state where the flow of the working fluid between the first supply port and the first actuator port is throttled and an open state where the throttle is released; and
    the groove allows the first supply port and the pilot port to communicate with each other in the throttle state and the open state.

5. The control valve according to claim 4, wherein
    the groove has:
        a first groove configured to allow the first supply port and the pilot port to communicate with each other in the open state; and
        a second groove configured to allow the first supply port and the pilot port to communicate with each other in the throttle state, wherein
    at the second communication position, the first groove is shut off from either one of the first supply port and the first actuator port, and the second groove is shut off from the other of the first supply port and the first actuator port.

6. The control valve according to claim 5, wherein
    the first groove and the second groove are separated from each other in a circumferential direction; and
    a part of the second groove overlaps a part of the first groove in an axial direction of the spool.

7. The control valve according to claim 1, wherein
    the housing further includes a downstream-side neutral port connected to a tank; and
    the spool is configured to allow the pilot port and the downstream-side neutral port to communicate with each other at the neutral position.

8. A control valve that controls a flow of a working fluid from a pump to an actuator and that controls the flow of the working fluid from the pump to a pilot chamber of another fluid pressure device, comprising:
    a housing having first and second supply ports, first and second actuator ports, and a pilot port, the first and second supply ports being connected to the pump, the first and second actuator ports being connected to the actuator, the pilot port being connected to the pilot chamber; and
    a spool accommodated slidably in an axial direction in the housing, the spool being configured to be switched between a first communication position where the first supply port and the first actuator port are allowed to communicate with each other and a second communication position where the second supply port and the second actuator port are allowed to communicate with each other, wherein the spool is configured to allow the first supply port and the pilot port to communicate with each other at both the first communication position and the second communication position, wherein the spool has a land portion and is configured to allow the first supply port and the first actuator port to communicate with each other at the first communication position and to shut off the communication between the first supply port and the first actuator port at the second communication position, the land portion is configured to allow the first supply port and the pilot port to communicate with each other at both the first communication position and the second communication position, and the land portion has a groove configured to allow the first supply port and the pilot port to communicate with each other at the first communication position.

9. The control valve according to claim 8, wherein
the spool is, at the first communication position, configured to switch between a throttle state where the flow of the working fluid between the first supply port and the first actuator port is throttled and an open state where the throttle is released; and the groove allows the first supply port and the pilot port to communicate with each other in the throttle state and the open state.

10. The control valve according to claim 9, wherein
the groove has:
  a first groove configured to allow the first supply port and the pilot port to communicate with each other in the open state; and
  a second groove configured to allow the first supply port and the pilot port to communicate with each other in the throttle state, wherein
at the second communication position, the first groove is shut off from either one of the first supply port and the first actuator port, and the second groove is shut off from the other of the first supply port and the first actuator port.

11. The control valve according to claim 10, wherein
the first groove and the second groove are separated from each other in a circumferential direction; and
a part of the second groove overlaps a part of the first groove in an axial direction of the spool.

\* \* \* \* \*